(No Model.)
J. FLOMERFELT.
MARKING AND FURROWING MACHINE.
No. 345,042. Patented July 6, 1886.
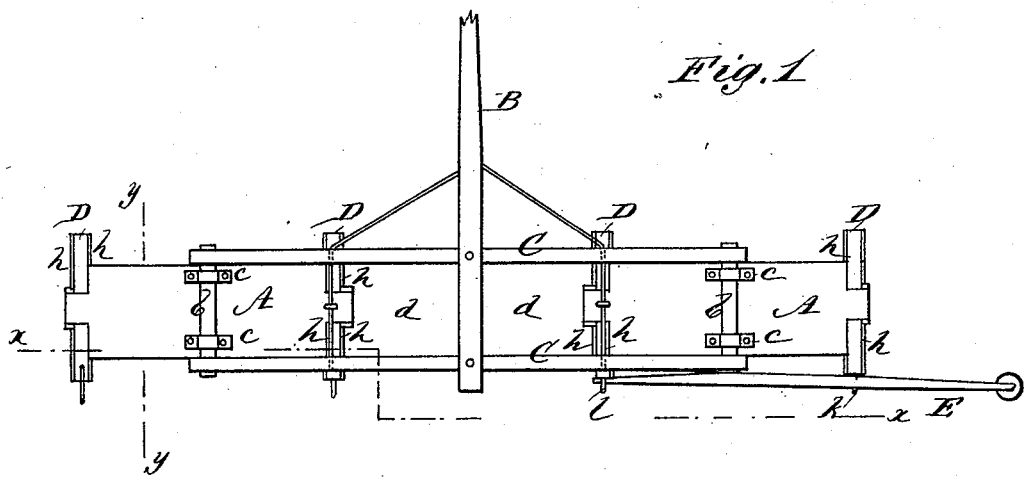
Fig. 1
Fig. 2
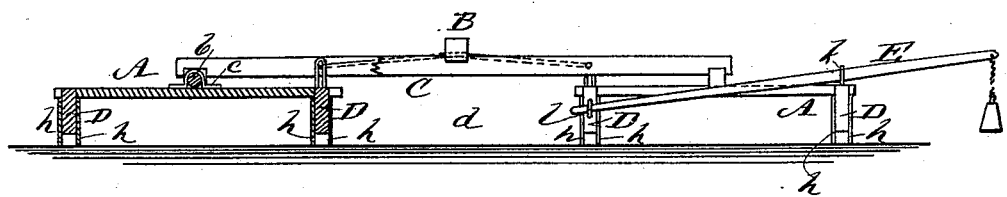
Fig. 3    Fig. 4
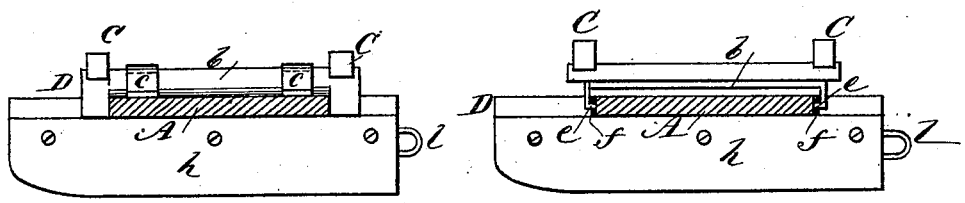
Fig. 5
WITNESSES:
C. Neveux
C. Sedgwick
INVENTOR:
J. Flomerfelt
BY Munn & Co.
ATTORNEYS.

UNITED STATES PATENT OFFICE.

JACOB FLOMERFELT, OF PEAPACK, NEW JERSEY.

MARKING AND FURROWING MACHINE.

SPECIFICATION forming part of Letters Patent No. 345,042, dated July 6, 1886.

Application filed February 25, 1886. Serial No. 193,227. (No model.)

*To all whom it may concern:*

Be it known that I, JACOB FLOMERFELT, of Peapack, in the county of Somerset and State of New Jersey, have invented a new and useful Improvement in Marking and Furrowing Machines, of which the following is a full, clear, and exact description.

This invention relates to draft implements or machines suitable for marking and furrowing land to prepare it for planting corn and other grain or seed, in which sleds provided with markers or runners and carried by independent frames or bodies, to adapt the implement to uneven ground, are used.

The invention consists in certain novel constructions and combinations of parts in an implement of the above description, substantially as hereinafter shown and described, whereby not only may the work be done with every desirable particularity and exactness, regardless of the unevenness of the ground, and weight reduced, to the saving of labor, time, and feed in the working of the team, but a central disposition of the weight and draft are obtained, and a cheap and simple implement capable of easy dismemberment for shipment or storage, is produced; also, other advantages are secured, as hereinafter set forth.

Reference is to be had to the accompanying drawings, forming a part of this specification, in which similar letters of reference indicate corresponding parts in all the figures.

Figure 1 represents a plan view of my improved furrower or marker and furrower. Fig. 2 is a partly sectional and longitudinal rear elevation of the same, taken as indicated by the line $x$ $x$ in Fig. 1. Fig. 3 is a transverse section, upon a larger scale, on the line $y$ $y$ in Fig. 1. Fig. 4 is a similar view to Fig. 3, showing a modified construction of certain parts. Fig. 5 is a face view of one of the details of said modification.

Referring in the first instance more particularly to Figs. 1, 2, and 3 of the drawings, A A are planks carrying the runners, and which are of any desired thickness, according to the weight required to be thrown upon the runners. These planks are arranged one on either side of the center draft bar or pole, B, at equal distances therefrom. Across each of these planks, in the center of its length, is a shaft, $b$, arranged to turn in clips or boxes $c$, secured on either plank. Said shafts are also rounded on their under sides, in order that the runner carriers or planks A may oscillate to adapt the markers or runners to uneven ground.

C C are scantlings or frame-pieces of the implement, to which the pole B is centrally attached, and to which the axles or shafts $b$ are secured.

The planks A A may be of any suitable width and of any desired length, according to the width of the furrow required, but they should be of the same length, or thereabout, and be arranged so as to leave a space, $d$, on either side of the pole. The runners or markers D D are carried at opposite ends of each plank, thus making four runners in all.

The shafts $b$ $b$, as shown in Figs. 1, 2, and 3, are supposed to be made of wood. They may, however, be made of iron, as shown in Fig. 4, secured to the planks A, and having bent trunnion-like ends $e$ $e$, which enter within apertures $g$, forming bearing-surfaces for the trunnions made in plates $f$ $f$, secured to the edges of the planks or runner-carriers A. This construction will be preferable in many instances, as it dispenses with the boxes or clips on the planks, and many bolts, and contributes to the rigidity and strength of the whole structure; but it is immaterial whether the shaft $b$ be made of wood or metal, so far as the support and oscillation of the runner-carriers A are concerned.

The runners or markers D D here shown are more especially adapted for preparing the ground for planting with or by automatic hand corn or seed planters. Thus they are faced on opposite sides with irons $h$, made to project below the bottoms of the bodies of the runners, so as to cut the ground and make a square hill, even with the surface, in which the seed is regularly planted to a certain depth. The wooden bodies of these runners will wear in common with the irons or cutters $h$, but the latter will have great durability, and, projecting some two inches (more or less) below the bottoms of the runners, will by their friction with the ground keep permanently sharp. Furthermore, when it is desired to make a marker adapted to prepare the ground for dropping and covering the seed with a hoe, said runners are easily convertible for the purpose by simply filling in the space between the lower projecting portions of the plates or irons $ff$ with a piece of wood.

The marking or furrowing implement constructed as described not only does away with all lateral or one-sided disposition of the weight and centralizes the same, but provides for a direct central draft, and gives the driver a direct and open central view, so that he can see the return center drag. By the oscillating attachment of the runner-carriers or planks, too, it will readily adapt itself to any uneven surface, and will make eight straight parallel marks at every round—that is, will make four rows when traveling in one direction and four more when returning, with a reduced weight of furrower and diminished friction in its contact with the ground. A seat, however, for the driver may, if desired, be attached, which of course will add to the weight. The drag E is attached by resting it in a hook, $k$, on the outer runner of either runner-carrier and entering its inner end in a staple, $l$, on the inner runner thereof, and provides for dropping at the end of the field when turning and for quickly passing or clearing any obstruction—such as a stump, rock, &c.—that may be in the path of the implement.

Having thus fully described my invention, I claim as new and desire to secure by Letters Patent—

The markers or runners D, composed of a main body part and opposite face-irons or cutters, $h\ h$, arranged to project below the bottoms of the bodies of the runners, essentially as described.

JACOB FLOMERFELT.

Witnesses:
 THOMAS CONROY,
 JOSEPH MORARITY.